United States Patent
Grazzi et al.

(10) Patent No.: US 11,466,144 B2
(45) Date of Patent: Oct. 11, 2022

(54) POLYETHYLENE COMPOSITION HAVING HIGH MECHANICAL PROPERTIES

(71) Applicant: Basell Poliolefine GmbH, Wesseling (DE)

(72) Inventors: Michele Grazzi, Ferrara (IT); Fabiana Fantinel, Ferrara (IT); Giampaolo Pellegatti, Ferrara (IT); Letizia Baraldi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 661 days.

(21) Appl. No.: 14/654,309

(22) PCT Filed: Nov. 25, 2013

(86) PCT No.: PCT/EP2013/074550
§ 371 (c)(1),
(2) Date: Jun. 19, 2015

(87) PCT Pub. No.: WO2014/095231
PCT Pub. Date: Jun. 26, 2014

(65) Prior Publication Data
US 2015/0329711 A1    Nov. 19, 2015

Related U.S. Application Data

(60) Provisional application No. 61/748,477, filed on Jan. 3, 2013.

(30) Foreign Application Priority Data
Dec. 20, 2012   (EP) .................................... 12198507

(51) Int. Cl.
  *C08L 23/04*   (2006.01)
  *C08J 5/18*    (2006.01)
  *C08L 23/08*   (2006.01)
  *B29C 49/00*   (2006.01)
  *B29C 48/00*   (2019.01)

(52) U.S. Cl.
  CPC ............ *C08L 23/04* (2013.01); *B29C 48/022* (2019.02); *B29C 49/0005* (2013.01); *C08J 5/18* (2013.01); *C08L 23/0815* (2013.01); *C08J 2323/06* (2013.01); *C08J 2323/08* (2013.01); *C08L 2205/02* (2013.01); *C08L 2205/025* (2013.01)

(58) Field of Classification Search
  CPC .................................................. C08L 23/0815
  See application file for complete search history.

(56) References Cited

U.S. PATENT DOCUMENTS

| 4,479,989 | A | 10/1984 | Mahal |
| 5,399,426 | A * | 3/1995 | Koch ...................... B32B 27/32 428/335 |
| 5,455,303 | A | 10/1995 | Panagopoulos, Jr. et al. |
| 6,462,161 | B1 | 10/2002 | Cady et al. |
| 7,538,173 | B2 * | 5/2009 | Schwab ................ C08F 210/16 526/160 |
| 8,765,874 | B2 | 7/2014 | Malakoff et al. |
| 2006/0047077 | A1 * | 3/2006 | Tas .......................... C08L 23/06 525/240 |
| 2007/0161747 | A1 | 7/2007 | Maier et al. |
| 2008/0038533 | A1 | 2/2008 | Best et al. |
| 2009/0192270 | A1 * | 7/2009 | Malakoff ............ C08L 23/0815 525/240 |
| 2012/0202942 | A1 | 8/2012 | Mavridis |

FOREIGN PATENT DOCUMENTS

| EA | 200900059 A1 | 6/2009 |
| EP | 1878764 A1 | 1/2008 |
| RU | 2170747 C2 | 7/2001 |
| WO | 9844011 A1 | 10/1998 |
| WO | 2007141036 A1 | 12/2007 |
| WO | 2008124557 A1 | 10/2008 |
| WO | 2009109367 A1 | 9/2009 |
| WO | WO2010081676 | * 7/2010 |
| WO | 2010144784 A1 | 12/2010 |
| WO | WO2011134897 | * 11/2011 |
| WO | 2014099608 A1 | 6/2014 |

OTHER PUBLICATIONS

Engage flyer, 2008.*
Materials Properties Derived from INSITE Metallocene Catalysts, P. Stephen Chum, William J. Kuper and Martin J. Guest, Adv. Matter 2000, 12, No. 23, Dec. 1, pp. 1759-1767.
"Empower Software Manual".
ASTM D1601-12, 'Standard Test Method for Dilute Solution Viscosity of Ethylene Polymers'.
ASTM D2857-95 (2007), 'Standard Practice for Dilute Solution Viscosity of Polymers'.
Declaration by Dr. Li Yuan Regarding Analysis of Dowlex 2045G.
Product Datasheet 'Lupolen 2420D', By Lyondellbasell, Published Apr. 11, 2009.

* cited by examiner

*Primary Examiner* — Irina Krylova

(57) ABSTRACT

Polyethylene composition with improved balance of mechanical and optical properties, comprising (all percentages being by weight):
  A) from 90 to 99.7% of a LLDPE having a density from 0.91 to 0.94 g/cm³ and a ratio MIF/MIE equal to or higher than 20, where MIF is the melt flow index at 190° C. with a load of 21.60 kg, and MIE is the melt flow index at 190° C. with a load of 2.16 kg, both determined according to ISO 1133;
  B) from 0.3 to 10% of a LDPE having MIE from 0.1 to 0.6 g/10 min.

8 Claims, No Drawings

POLYETHYLENE COMPOSITION HAVING HIGH MECHANICAL PROPERTIES

This application is the U.S. National Phase of PCT International Application PCT/EP2013/074550, filed Nov. 25, 2013, claiming benefit of priority to European Patent Application No. 12198507.1, filed Dec. 20, 2012, and benefit of priority under 35 U.S.C. § 119(e) of U.S. Provisional Application No. 61/748,477 filed Jan. 3, 2013, the contents of which are incorporated herein by reference in its entirety.

FIELD OF THE INVENTION

The present invention concerns polyethylene composition comprising a linear low-density copolymer of ethylene (LLDPE) having relatively high MIF/MIE values, i.e. of 20 or more, and a low density polyethylene (LDPE) having relatively high molecular weights.

The films obtainable from the said composition possess an excellent balance of mechanical properties and good optical properties.

BACKGROUND OF THE INVENTION

Achieving an optimal balance of mechanical properties in LLDPE films, in particular of impact resistance (Dart Drop) and tear resistance, is a very challenging goal.

The problem is well illustrated in the examples WO2012/109246, where the highest Dart Drop values are obtained in correspondence with relatively low tear resistance (Elmendorf) values, and vice versa.

It has now been found that such problem can be solved by the compositions of the present invention, which are able to provide films with high Dart Drop and Elmendorf values in combination. Moreover the Elmendorf values in the machine direction (MD) and in the transversal direction (TD) are very close each other, consequently avoiding the occurrence of a preferred tear direction.

SUMMARY OF THE INVENTION

Thus the present invention provides a polyethylene composition comprising (all percentages being by weight):
  A) from 90 to 99.7%, preferably from 90 to 99%, in particular from 92 to 99%, of a LLDPE having a density from 0.91 to 0.94 g/cm$^3$, preferably from 0.91 to 0.93 g/cm$^3$, determined according to ISO 1183 at 23° C., and a ratio MIF/MIE equal to or higher than 20, where MIF is the melt flow index at 190° C. with a load of 21.60 kg, and MIE is the melt flow index at 190° C. with a load of 2.16 kg, both determined according to ISO 1133;
  B) from 0.3 to 10%, preferably from 1 to 10%, in particular from 1 to 8%, of a LDPE having MIE from 0.1 to 0.6 g/10 min., preferably from 0.1 to 0.4 g/10 min.

DETAILED DESCRIPTION OF THE INVENTION

When particularly good transparency, thus low haze values, and high gloss are desired, the relative amounts of components is preferably from 96 to 90% of A) and from 4 to 10% of B), in particular from to 96 to 92% of A) and from 4 to 8% of B).

All the percentages of A) and B) are referred to the total weight of A)+B).

The ratio MIF/MIE provides a rheological measure of molecular weight distribution.

Preferred MIF/MIE values for the component A) of the composition according to the invention range from 20 to 40, in particular from 25 to 35.

Another measure of the molecular weight distribution is provided by the ratio Mw/Mn, where Mw is the weight average molar mass and Mn is the number average molar mass, both measured by GPC (Gel Permeation Chromatography), as explained in the examples.

Preferred Mw/Mn values for the component A) of the composition according to the invention are equal to or higher than 5 and typically range from 5 to 10, in particular from 5 to 8.

Moreover the said component A) has preferably at least one of the following additional features.
  Mw equal to or smaller than 200000 g/mol, more preferably equal to or smaller than 150000 g/mol;
  Mz (measured by GPC as well) equal to or smaller than 500000 g/mol, more preferably equal to or smaller than 400000 g/mol;
  MIF: 15-50 g/10 min., in particular 20-45 g/10 min.;
  MIE: 0.5-5 g/10 min.;
  Solubility in xylene at 25° C. equal to or lower than 20% by weight, more preferably equal to or lower than 15% by weight, in particular 8-20% or 8-15% by weight.

As previously mentioned, the expression "LLDPE" means that component A) is a linear low-density copolymer of ethylene. Such copolymer can also be a composition of two or more polymer fractions, at least one of which is a copolymer of ethylene.

The comonomer or comonomers present in A) are generally selected from olefins having formula CH$_2$=CHR wherein R is an alkyl radical, linear or branched, having from 1 to 10 carbon atoms.

Specific examples are propylene, butene-1, pentene-1, 4-methylpentene-1, hexene-1, octene-1 and decene-1. A particularly preferred comonomer is hexene-1.

The preferred comonomer content is of 5-20% by weight, in particular from 8 to 15% by weight, with respect to the total weight of A).

In particular, in a preferred embodiment, the component A) of the composition according to the invention comprises the following fractions:
A$^I$) 25-45% by weight of an ethylene homopolymer or copolymer (the homopolymer being preferred) with intrinsic viscosity of 0.9-1.3 dl/g;
A$^{II}$) 55-75% by weight of an ethylene copolymer with intrinsic viscosity at higher than the intrinsic viscosity value of A$^I$), preferably equal to or higher than 1.5 dl/g, preferably from 1.5 to 2.5 dl/g, in particular from 1.5 to 2.4 dl/g.

The above percent amounts are given with respect to the total weight of A$^I$)+A$^{II}$).

The said intrinsic viscosity values are measured in tetrahydronaphthalene at 135° C.

Preferably the amount of comonomer in fraction A$^{II}$) is from 10 to 25% by weight.

While no necessary limitation is known to exist in principle on the kind of polymerization processes and catalysts to be used, it has been found that the component A) of the composition according to the invention can be prepared in the presence of a mixed catalyst system.

In particular, component A) can be prepared by using a catalyst composition comprising two different polymerization catalysts, of which one is based on a metallocene compound, in particular a metallocene complex of Zr or Hf (respectively called zirconocene and hafnocene), and the other is based on an iron complex having a tridentate ligand bearing at least two aryl radicals with each preferably bearing a halogen or tert. alkyl substituent in the ortho-position.

Metallocene catalyst components are, for example, cyclopentadienyl complexes. The cyclopentadienyl complexes can be, for example, bridged or unbridged biscyclopentadienyl complexes as described, for example, in EP 129 368, EP 561 479, EP 545 304 and EP 576 970, monocyclopentadienyl complexes such as bridged amidocyclopentadienyl complexes described, for example, in EP 416 815, multinuclear cyclopentadienyl complexes as described in EP 632 063, pi-ligand-substituted tetrahydropentalenes as described in EP 659 758 or pi-ligand-substituted tetrahydroindenes as described in EP 661 300.

A specific example of zirconocene compound is bis(1-n-butyl-3-methyl-cyclopentadienyl)zirconium dichloride A specific example of hafnocene compound is bis(n-butylcyclopentadienyl)hafinium dichloride.

Preferred iron complexes are 2,6-bis[1-(2-tert.butylphenylimino)ethyl]pyridine iron(II) dichloride, 2,6-bis[1-(2-tert.butyl-6-chlorophenylimino)ethyl]pyridine iron(II) dichloride, 2,6-bis[1-(2-chloro-6-methylphenylimino)ethyl]pyridine iron(II) dichloride, 2,6-bis[1-(2-chloro-4,6-dimethylphenylimino)ethyl]pyridine iron(II) dichloride, 2,6-bis[1-(2,4-dichlorophenylimino)ethyl]pyridine iron(II) dichloride, 2,6-bis[1-(2,6-dichlorophenylimino)ethyl]pyridine iron(II) dichloride, 2,6-bis[1-(2,4-dichlorophenylimino)methyl]pyridine iron(II) dichloride, 2,6-bis[1-(2, 4-dichloro-6-methyl-phenylimino)ethyl]pyridine iron(II) dichloride, 2,6-bis [1-(2,4-difluorophenylimino)ethyl]pyridine iron(II) dichloride, 2,6-bis [1-(2,4-dibromophenylimino)ethyl]pyridine iron(II) dichloride or the respective trichlorides, dibromides or tribromides.

The molar ratio of the metallocene compound to the iron complex is usually in the range from 1:100 to 100:1, particularly preferably from 12:1 to 8:1.

In addition to the said components, an activating compound, in particular an aluminoxane, is generally used. As aluminoxanes, it is possible to use, for example, the compounds described in WO00/31090.

A particularly useful aluminoxane compound is methylaluminoxane.

It has been found to be advantageous to use the metallocene compound or the iron complex and the aluminoxane compounds in such amounts that the atomic ratio of aluminum from the aluminoxane compounds, including any aluminum alkyl still present, to the transition metal from the metallocene compound, be in the range from 1:1 to 2000:1, preferably from 10:1 to 500:1 and in particular in the range from 20:1 to 400:1. The atomic ratio of aluminum from the aluminoxane compounds, including any aluminum alkyl still present, to the iron from the iron complex, is usually in the range from 1:1 to 2000:1, preferably from 10:1 to 500:1 and in particular in the range from 20:1 to 400:1.

The said catalyst systems can be conveniently supported on organic or inorganic supports, like porous polymer particles or silica.

Conventional molecular weight regulators known in the art, such as chain transfer agents (e.g. hydrogen or $ZnEt_2$), may be used.

The process for producing the component A) of the composition according to the invention can be carried out using all industrially known polymerization methods at temperatures in the range from −60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. Solution processes, suspension processes, stirred gas-phase processes and gas-phase fluidized-bed processes are all possible.

In particular, the component A) of the composition according to the invention can be prepared with catalysts and polymerization processes as described in the international application WO2010081676 herewith incorporated by reference.

The expression "LDPE" means that the component B) of the composition according to the invention is a low density polyethylene.

Said LDPE is typically a homopolymer of ethylene or a copolymer of ethylene containing smaller quantities of comonomers, such as butyl acrylate, prepared by polymerization at high pressure, in a tubular or autoclave reactor, using free radical initiators.

The density of the said LDPE polymer generally ranges from 0.910 to 0.93 g/cm$^3$ (measured according to ISO 1183 at 23° C.).

The LDPE polymers having the characteristics quoted above for the component B) are known in the art. Specific examples are the commercially available polymers with the brand name Lupolen (LyondellBasell) and Petrothene (Equistar).

In addition to the aforesaid components, the composition of the present invention can contain other polymeric components, such as olefin elastomers, in particular ethylene/propylene (EPR) or ethylene/propylene/diene (EPDM) elastomers, and additives commonly used in the art, such as stabilizers (in particular phenolic antioxidants and process stabilizers such as the organic phosphites), pigments, fillers, nucleating agents, release agents, lubricating and antistatic agents, flame retardants and plasticizers.

The composition of the present invention can be prepared by mixing the components A), B), and other optional components, in the melted state.

The processes of mixing in the melted state advantageously used are of conventional type and are based on the use of mixing devices known in the art, such as single-screw and double-screw extruders.

In view of its ready processability in the melted state and its mechanical properties, the composition of the present invention is particularly suitable for the preparation of extruded articles in general, and in particular of film, monolayer or multilayer, whether cast or mono- or biaxially oriented, including blown films, in which at least one layer comprises the aforesaid compositions.

As mentioned above, the term "film" includes both single layer or multiple layer structures, each layer having a thickness of from 2 to 50 micron. Preferably, each layer has a thickness of 2 to 30 micron. The overall film thickness is typically from 2 to 100 micron, preferably from 2 to 50 micron.

The films can be prepared by processes well known to those skilled in the art, such as cast, blown-air, blown-water, oriented, and biaxially oriented. The films may also be used in extrusion coating and extrusion lamination processes. When the films are coextruded, they can be produced using conventional methods and extrusion equipment well known to those skilled in the art, where layers of polymer melts are combined by introducing multiple polymer melt streams into a combining block/manifold or die which then directs the melt streams to flow together (while still in the block/manifold or die), then exiting the die together as a single flow stream. Alternately, multiple polymer melt streams can be introduced into a die and then combined just after exiting the die.

In particular, the processes for the preparation of blown film are well known in the art and comprise a stage of extrusion through a die with an annular gap.

The product from this stage is a tubular extrudate which is then inflated with air, to obtain a tubular bubble which is cooled and collapsed to obtain the film.

Thus another object of the present invention are the films, in particular the blown films obtained from above described composition. Such films are preferably characterized by the following properties.

Dart Drop equal to or higher than 10 g/micron, in particular equal to or higher than 15 g/micron;

Elmendorf equal to or higher than 12 g/micron, in particular equal to or higher than 15 g/micron, particularly in the transversal direction (TD);

Haze equal to or lower than 30%.

The details of the test methods are given in the examples.

EXAMPLES

The following examples are given to illustrate, without limiting, the present invention.

Unless differently stated, the following test methods are used to determine the properties reported in the detailed description and in the examples.

Density

Determined according to ISO 1183 at 23° C.

Melt Flow Index

Determined according to ISO 1133 at 190° C. with the specified load.

The Molar Mass Distribution Width (MWD) or Polydispersity is Defined as Mw/Mn.

Definition of Mw, Mn, Mz, MWD can be found in the 'Handbook of PE', ed. A. Peacock, p. 7-10, Marcel Dekker Inc., New York/Basel 2000. The determination of the molar mass distributions and the means Mn, Mw and Mw/Mn derived therefrom was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB.

A Waters (Milford, Mass., USA) Alliance GPCV/2000 chromatographic system equipped with four separation columns PL Olexis (13 μm internal pore diameter) connected in series was used. The solvent was vacuum distilled under nitrogen and was stabilized with 0.025% by weight of 2,6-di-tert-butyl-4-methylphenol. The flow rate used was 1 ml/min, the injection was 500 μl and polymer concentration was in the range of 0.01%<conc.<0.05% w/w. The molecular weight calibration was established by using monodisperse polystyrene (PS) standards from Polymer Laboratories (now Agilent, 5301 Stevens Creek Boulevard Santa Clara, Calif. 95051, USA) in the range from 580 g/mol up to 7500000 g/mol. The calibration curve was then adapted to Polyethylene (PE) by means of the Universal Calibration method (Benoit H., Rempp P. and Grubisic Z., in *J. Polymer Sci., Phys. Ed.*, 5, 753 (1967)). The Mark-Houwink parameters used herefore were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. (Scholte Th. G., Meijerink N. L. J., Schoffeleers H. M. and Brands A. M. G., «Mark-Houwink Equation and GPC Calibration for Linear Short-Chain Branched Polyolefins, including Polypropylene and Ethylene-Propylene Copolymers», *J. Appl. Polym. Sci.*, 29, 3763-3782 (1984)). Data recording, calibration and calculation was carried out using the Empower software by Waters. Further with relevance to smooth, convenient extrusion processing at low pressure, preferably the amount of the polyethylene of the invention with a molar mass of <1 Mio. g/mol, as determined by GPC for standard determination of the molecular weight distribution, is preferably above 95.5% by weight. This is determined in the usual course of the molar mass distribution measurement by applying the Empower software by Waters, see supra.

Applying the universal calibration method based on the Mark-Houwink constants given above may additionally be nicely and comprehensibly inferred in detail from ASTM-6474-99, along with further explanation on using an additional internal standard-PE for spiking a given sample during chromatography runs, after calibration.

Intrinsic Viscosity

Determined in tetrahydronaphthalene at 135° C. (ASTM D 2857).

Xylene Soluble and Insoluble Fractions 2.5 g of polymer and 250 cm³ of xylene are introduced in a glass flask equipped with a refrigerator and a magnetic stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm³ of the filtered liquid is poured in a previously weighed aluminium container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

$^{13}$C NMR Comonomer Content Determination $^{13}$C NMR spectra were acquired on a Bruker AV-600 spectrometer, operating at 160.91 MHz in the Fourier transform mode at 120° C.

The samples were dissolved in 1,1,2,2-tetrachloroethane-d2 at 120° C. with a 8% wt/v concentration. Each spectrum was acquired with a 90° pulse, 15 seconds of delay between pulses and CPD to remove $^1$H-$^{13}$C coupling. About 1500 transients were stored in 32K data points using a spectral window of 9000 Hz.

The peak of the $T_{\delta\delta}$ carbon (nomenclature according to C. J. Carman, R. A. Harrington and C. E. Wilkes, *Macromolecules*, 10, 536-544 (1977) was used as internal reference at 29.9 ppm.

The assignments of the spectra were made according to E. T. Hsieh, J. C. Randall, *Macromolecules*, 15, 353-360 (1982); E. T. Hsieh, J. C. Randall, *Macromolecules*, 15, 1402-1406 (1982); J. C. Randal, Macromol. Chem Phys., C29, 201 (1989); M. Kakugo, Y. Naito, K. Mizunuma and T. Miyatake, *Macromolecules*, 15, 1150-1152 (1982).

The evaluation of triad distribution and of the composition was made starting from relations between peaks and triads described in ref 5, modified to consider overlaps of signals in the spectra.

C2C6

$HHH = 100\, T_{\beta\beta}/S$
$HHE = 100\, T_{\beta\delta}/S$
$EHE = 100\, T_{\delta\delta}/S$
$HEH = 100\, S_{\beta\beta}/S$
$HEE = 100\, S_{\beta\delta}/S$
$EEE = 100(0.25\, S_{\gamma\delta} + 0.5\, S_{\delta\delta})/S$ Fraction $A^I$) Content The fraction $A^I$) content has been measured by subjecting component A) to the TREF analysis as described below. The TREF analysis were carried out under the following conditions: solvent 1,2,4-trichloro-benzene, flow: 1 ml/min, heating rate: 1° C./min, amount of polymer 5-10 mg, support: silica gel.

The following approach was applied in order to obtain a preparative separation between the fractions $A^I$) and $A^{II}$). An amount of sample between 1 and 2 g was dissolved in 180 mL of o-xylene at 137° C., under stirring condition for about 1 h. This solution was then loaded in a steel column packed with an inert support and heated at the same temperature of the sample solution.

The crystallization of the polymer was carried out by cooling down linearly in 10 h from 137 to 77° C. The elution of the polymer was step-wise: at 77, 100 and 137° C. with o-xylene. Two sample fractions (77 and 100° C.) were recovered by precipitation with acetone and they were subsequently investigated with other analytical techniques. At 137° C. no polymer was found.

The first fractions turned out to be made of the fraction $A^{II}$), whereas fraction $A^I$) was found in the second one. The amount of fraction $A^I$) was calculated from the above fraction amount so determined.

Gloss at 45°

Determined according to ASTM D 2457.

Haze

Determined according to ASTM method D 1003.

Clarity

Determined according to ASTM D 1746.

Dart Drop Test

Determined according to ASTM method D 1709A.

Stress at Break

Determined according to ASTM D 882, both in the machine direction (MD) and in the transverse direction (TD).

Elmendorf Tear Strength

Determined according to ASTM D 1922, both in the machine direction (MD) and in the transverse direction (TD).

Materials Used in the Examples

Component A)

Such component was prepared as follows.

Preparation of the Mixed Catalyst Systems:

Complexes 1 and 2 were used for the catalyst preparation

Complex 1 is 2,6-Bis[1-(2-Chlor-4,6-trimethylphenylimino)ethyl]pyridine iron(II) dichloride. It was prepared as in example 1 of WO 98/27124 and reacted in an analogous manner with iron(II) chloride to said complex 1.

Complex 2 is Bis(1-n-butyl-3-methyl-cyclopentadienyl) zirconium dichloride is commercially available from Albemarle Inc.

Methylalumoxane (MAO) was received from Chemtura Inc. as a 30% (w/w) toluene solution.

Support:

XPO-2326A, a spray-dried silica gel from Grace

Support pretreatment: XPO-2326 A was calcinated at 600° C. for 6 hours.

Preparation of the Catalyst—Catalyst 1:

5 Kg of silica XPO2326 A were put in a 30 L steel reactor at 0° C. In a separate reactor, 5.5 kg MAO (4.75 M in Toluene) were mixed with 46.6 gr of complex 1 and 114.5 gr of complex 2. The solution was stirred for 3 hours at RT. Then the solution was transferred into a can for transport and the reactor was flushed with 500 ml Toluene.

The mixture was cooled, to 0° C., while stirring for 30 minutes, and then it was poured very slowly, i.e. "dropwise" to the silica in the 30 L reactor. The mixture was stirred for 1 h. The volume of the solution was 105% of that of the pores of the support. Then 14 L heptane were added to the catalyst volume of the solution was 250% of that of the pores of the support so that a slurry was obtained. The slurry of the catalyst was stirred for 30 min.

Afterwards the catalyst slurry was filtered and dried with nitrogen flow till obtaining a free flowing powder with an ivory color.

The ratio of loadings of complex 1 and that of complex 2 is 16.5/53 µmol/g:µmol/g and the Al/(complex 1+complex 2) ratio is 90:1 mol:mol.

Polymermisation Process:

Samples have been produced in Gas Phase fluidized bed continuous process. Process details are given in Table 1. The catalyst was metered into the reactor discontinuously by means of pressurized propane. The reactor pressure was controlled at 24 barg (bar gauge, i.e. relative pressure increase above atmospheric pressure). The average polyethylene output of the gas-phase fluidized bed reactor was 85.6 kg/h (Details in Table 1). The hold-up in the reactor was controlled, giving a residence time of 2.8 hours in the reactor. Gas velocity was 0.35 m/s. As an antistatic 7.6 ppm (on production) Costelan AS25 were fed. Quite high mileage was achieved, no sheeting was observed during reactor operation. The discharged polymer was dried in a continuous way by flushing it with nitrogen.

The polymerization conditions are given in the following Table 1:

TABLE 1

| Catalyst | 1 |
|---|---|
| Mileage [g/g] | 5903 |
| Temperature [° C.] | 75 |
| Ethylene [Vol %] | 59.7 |
| Hexene/Ethylene ratio [Vol %] | 7.4 |
| Total Inert propane [Vol %]: | 35.89 |
| Ethylene [kg/h] | 102 |
| Hexene or butene/Ethylene [kg/Ethylene kg] | 0.152 |
| Hydrogen [ppm] | 11 |

Product details for the so obtained component A) are reported in Table 2 below.

TABLE 2

| Component A) | |
|---|---|
| Property | Value |
| Density (cm³/g) | 0.921 |
| MIE (g/10 min.) | 1.3 |
| MIF (g/10 min.) | 37.9 |
| MIF/MIE | 29.2 |
| Mz [g/mol] | 312146 |
| Mw [g/mol] | 117542 |
| Mn [g/mol] | 18695 |
| Mw/Mn | 6.3 |
| I.V. [dl/g] | 1.56 |
| Xylene Solubility [% by weight] | 13.2 |

TABLE 2-continued

| Component A) | |
| --- | --- |
| Property | Value |
| NMR Comononer Content [% by weight] | 11.2 |
| Fraction $A^I$) [% by weight] | 35 |
| I.V. of fraction $A^I$) [dl/g] | 1.12 |
| I.V. of fraction $A^{II}$) [dl/g] | 2.1 |
| NMR Comonomer Content of fraction $A^{II}$) [% by weight] | 16.5 |

Note:
I.V. = Intrinsic Viscosity

Component B

LDPE Lupolen 2420 D having density of 0.926 g/cm$^3$ and MIE of 0.25 g/10 min.

Examples 1-3 and Comparative Example 1

Before using them to prepare films, the said components A) and B) are mixed by extrusion, together with the silica antiblocking additive SYLOBLOCK 45H (product of W. R. Grace & Co.) and erucamide.

The relative amounts of the said components are reported in Table 3.

The said extrusion is carried out in a co-rotating twin screw three lobs profile extruder (ZE25 type, length/diameter ratio of 34, manufactured by Berstorff) under nitrogen atmosphere in the following conditions:
Rotation speed: 210 rpm;
Extruder output: 13 kg/hour;
Melt temperature: 240-245° C.;
Melt Pressure: 33-35 bar.

Films are then prepared on a Collin extrusion line equipped with a mono-screw with the screw length/screw diameter ratio of 30 mm/30 xD and no IBCS system (Internal Bubble Cooling System). During the extrusion trials, the melt is extruded through an annular die with a diameter of 100 mm and 2.0 mm gap. At the exit from the die, the melt tube is subjected to intensive air cooling, immediately blown up to about 2.5 times the diameter of the die and stretched in the direction of the flow.

The final film thickness of the films is approximately 25 micron, with a monolayer structure.

The main operating conditions are:
Barrel temperature: 180-190-190-200-200° C.;
Adaptor temperature: 210° C.;
Die temperature: 210-210-210° C.;
Screw speed: 100 rpm;
Blow-up ratio: 3.1.

The film of Comparative Example 1 is obtained from a composition prepared as above described, but without adding component B).

The properties of the so obtained films are reported in Table 3.

TABLE 3

| | Ex. 1 | Ex. 2 | Ex. 3 | Comp. 1 |
| --- | --- | --- | --- | --- |
| Composition | | | | |
| Component A) [% by weight] | 99.175 | 96.675 | 94.675 | 99.675 |
| Component B) [% by weight] | 0.5 | 3 | 5 | 0 |
| Antiblock [% by weight] | 0.25 | 0.25 | 0.25 | 0.25 |
| Erucamide [% by weight] | 0.075 | 0.075 | 0.075 | 0.075 |

TABLE 3-continued

| | Ex. 1 | Ex. 2 | Ex. 3 | Comp. 1 |
| --- | --- | --- | --- | --- |
| Film Properties | | | | |
| Gloss @ 45° [‰] | 10.2 | 13 | 33.9 | 10.3 |
| Haze [%] | 63 | 50.7 | 23.8 | 60.5 |
| Clarity [%] | 34.6 | 69.1 | 91.1 | 31.3 |
| Dart Drop [g] | >800 | >800 | >800 | >800 |
| Dart Drop [g/micron] | >32 | >32 | >32 | >32 |
| Tensile Strenght (MD) [MPa] | 44.5 | 41.7 | 43.3 | 44.0 |
| Tensile Strenght (TD) [MPa] | 39.1 | 38.4 | 39.0 | 35.5 |
| ETS MD [g/micron] | 18.7 | 16.0 | 14.8 | 16.2 |
| ETS TD [g/micron] | 21 | 20.5 | 22.2 | 19.7 |

Notes:
MD = Machine Direction; TD = Transversal Direction; ETS = Elmendorf Tear Strength.

What is claimed is:

1. A film comprising:
    A) 90-96% by weight of a LLDPE having a density from 0.91 to 0.94 g/cm$^3$, and a ratio MIF/MIE equal to or higher than 20, where MIF is the melt flow index at 190° C. with a load of 21.60 kg, and MIE is the melt flow index at 190° C. with a load of 2.16 kg, both determined according to ISO 1133, wherein component A) comprises the following fractions:
    $A^I$) 25-45% by weight of an ethylene homopolymer or copolymer with an intrinsic viscosity of 0.9-1.3 dl/g;
    $A^{II}$) 55-75% by weight of an ethylene copolymer with intrinsic viscosity at higher than the intrinsic viscosity value of $A^I$), and
    wherein component A) has a comonomer content of 5 to 20 wt. %, based on the total weight of component A), and wherein component A) has a Mw/Mn of 5 to 10; and
    B) 4-10% by weight of a LDPE having a MIE from 0.1-0.6 g/10 min and a density of from 0.91 to 0.93 g/cm$^3$, wherein the LDPE is an ethylene polymer and is prepared at high pressure using free radical initiators wherein the film has a haze between 15 and 30% and has an Elmendorf tear in the transversal direction of at least 15 g/micron.

2. The film of claim 1, wherein the component A) has a comonomer content of from 8 to 20% by weight.

3. The film of claim 1, wherein the comonomer content includes one or more comonomers, and wherein the comonomers present in the component A) are olefins having the general formula $CH_2$=CHR, wherein R is an alkyl radical, linear or branched, having from 1 to 10 carbon atoms.

4. The film of claim 3, wherein the one or more comonomers is/are selected from the group consisting of propylene, butene-1, pentene-1, 4-methylpentene-1, hexene-1, octene-1 and decene-1.

5. The film of claim 1, wherein the component A) has at least one of the following additional features:
    a Mw equal to or smaller than 200000 g/mol;
    a Mz equal to or smaller than 500000 g/mol;
    a MIF: 15-50 g/10 min.;
    a MIE: 0.5-5 g/10 min.;
    a solubility in xylene at 25° C. equal to or lower than 20% by weight.

6. The film of claim 1, wherein the component A) has a Mw/Mn of 6 to 10.

7. The film of claim 1, wherein the component B) has an MIE from 0.1-0.4 g/10 min.

8. The film of claim 1, comprising a haze between 18 and 25%, and a Elmendorf tear in the transversal direction between 15 and 22.2 g/micron.

* * * * *